United States Patent
Cooray et al.

(10) Patent No.: US 9,311,239 B2
(45) Date of Patent: Apr. 12, 2016

(54) POWER EFFICIENT LEVEL ONE DATA CACHE ACCESS WITH PRE-VALIDATED TAGS

(71) Applicant: Intel Corporation, Santa Clara, CA (US)

(72) Inventors: Niranjan Cooray, Folsom, CA (US); Steffen Kosinski, Braunschweig (DE); Rami May, Haifa (IL); Doron Gershon, Haifa (IL); Jaroslaw Topp, Schoeppenstedt (DE); Varun Mohandru, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 456 days.

(21) Appl. No.: 13/976,313

(22) PCT Filed: Mar. 14, 2013

(86) PCT No.: PCT/US2013/031282
§ 371 (c)(1),
(2) Date: Jun. 26, 2013

(87) PCT Pub. No.: WO2014/142867
PCT Pub. Date: Sep. 18, 2014

(65) Prior Publication Data
US 2015/0220436 A1    Aug. 6, 2015

(51) Int. Cl.
*G06F 12/00* (2006.01)
*G06F 12/08* (2006.01)
*G06F 12/10* (2006.01)

(52) U.S. Cl.
CPC ........ *G06F 12/0811* (2013.01); *G06F 12/0864* (2013.01); *G06F 12/10* (2013.01); *G06F 12/1027* (2013.01); *G06F 12/1045* (2013.01); *G06F 2212/283* (2013.01); *G06F 2212/6032* (2013.04); *G06F 2212/65* (2013.01); *G06F 2212/681* (2013.01); *Y02B 60/1225* (2013.01)

(58) Field of Classification Search
None
See application file for complete search history.

(56) References Cited

U.S. PATENT DOCUMENTS

| | | |
|---|---|---|
| 4,700,291 A | 10/1987 | Saito |
| 4,727,484 A | 2/1988 | Saito |
| 5,606,687 A | 2/1997 | Mehring et al. |
| 5,946,718 A | 8/1999 | Green |
| 5,970,509 A | 10/1999 | Green |
| 6,065,091 A | 5/2000 | Green |

(Continued)

OTHER PUBLICATIONS

International Search Report and Written Opinion, International Patent No. PCT/US2013/031282, mailed Dec. 26, 2013, 10 pages.

*Primary Examiner* — Kevin Verbrugge
*Assistant Examiner* — Craig Goldschmidt
(74) *Attorney, Agent, or Firm* — Trop, Pruner & Hu, P.C.

(57) ABSTRACT

A system and method to implement a tag structure for a cache memory that includes a multi-way, set-associative translation lookaside buffer. The tag structure may store vectors in an L1 tag array to enable an L1 tag lookup that has fewer bits per entry and consumes less power. The vectors may identify entries in a translation lookaside buffer tag array. When a virtual memory address associated with a memory access instruction hits in the translation lookaside buffer, the translation lookaside buffer may generate a vector identifying the set and the way of the translation lookaside buffer entry that matched. This vector may then be compared to a group of vectors stored in a set of the L1 tag arrays to determine whether the virtual memory address hits in the L1 cache.

20 Claims, 8 Drawing Sheets

(56) References Cited

U.S. PATENT DOCUMENTS

| | | |
|---|---|---|
| 6,122,715 A | 9/2000 | Palanca et al. |
| 6,202,129 B1 | 3/2001 | Palanca et al. |
| 6,216,215 B1 | 4/2001 | Palanca et al. |
| 6,237,073 B1 | 5/2001 | Dean et al. |
| 6,442,666 B1 | 8/2002 | Stracovsky |
| 6,526,499 B2 | 2/2003 | Palanca et al. |
| 6,584,547 B2 | 6/2003 | Palanca et al. |
| 6,643,745 B1 | 11/2003 | Palanca et al. |
| 6,751,706 B2 | 6/2004 | Chauvel et al. |
| 6,772,315 B1 | 8/2004 | Perego |
| 6,851,038 B1 | 2/2005 | Krolski et al. |
| 7,124,277 B2 | 10/2006 | Maiyuran et al. |
| 7,181,590 B2 | 2/2007 | Kottapalli et al. |
| 7,210,026 B2 | 4/2007 | Damron |
| 7,584,394 B2 | 9/2009 | Choudhury et al. |
| 8,214,598 B2 | 7/2012 | Dixon et al. |
| 2002/0032827 A1 | 3/2002 | Nguyen et al. |
| 2002/0062418 A1 | 5/2002 | Luick |
| 2002/0065980 A1 | 5/2002 | Lasserre et al. |
| 2002/0065992 A1 | 5/2002 | Chauvel et al. |
| 2003/0140205 A1 | 7/2003 | Dahan et al. |
| 2003/0140244 A1 | 7/2003 | Dahan et al. |
| 2003/0140245 A1 | 7/2003 | Dahan et al. |
| 2004/0003298 A1 | 1/2004 | Luick |
| 2004/0039893 A1 | 2/2004 | Lyon |
| 2004/0103253 A1 | 5/2004 | Kamei et al. |
| 2005/0050277 A1 | 3/2005 | Shen et al. |
| 2005/0154839 A1 | 7/2005 | DeWitt et al. |
| 2005/0210204 A1 | 9/2005 | Yamazaki |
| 2006/0047884 A1 | 3/2006 | Tran et al. |
| 2006/0047912 A1 | 3/2006 | Chinnakonda |
| 2006/0253654 A1 | 11/2006 | Adachi |
| 2007/0150659 A1 | 6/2007 | Arimilli et al. |
| 2007/0174553 A1 | 7/2007 | Morrow et al. |
| 2007/0288725 A1 | 12/2007 | Luick |
| 2009/0024876 A1 | 1/2009 | Arora et al. |
| 2009/0138664 A1 | 5/2009 | Arimilli et al. |
| 2009/0210624 A1 | 8/2009 | Luick |
| 2009/0210625 A1 | 8/2009 | Luick |
| 2010/0205344 A1 | 8/2010 | Caprioli et al. |
| 2010/0332721 A1 | 12/2010 | Yamada et al. |
| 2010/0332806 A1 | 12/2010 | Golla et al. |
| 2011/0131381 A1 | 6/2011 | Kaplan |
| 2011/0161595 A1 | 6/2011 | Fang et al. |
| 2011/0320723 A1 | 12/2011 | Cohen et al. |
| 2012/0047311 A1 | 2/2012 | Sheaffer |
| 2012/0221793 A1 | 8/2012 | Tran |
| 2012/0221796 A1 | 8/2012 | Tran |
| 2012/0254540 A1 | 10/2012 | Kou et al. |
| 2013/0046936 A1 | 2/2013 | Tran |

TLB TAG ARRAY ENTRY

L1 TAG ARRAY ENTRY

POWER EFFICIENT LEVEL ONE DATA CACHE ACCESS WITH PRE-VALIDATED TAGS

TECHNICAL FIELD

Embodiments described herein generally relate to processor architecture and, in particular, architecture of a cache memory.

BACKGROUND

Due to large address spaces supported by modern processors, a traditional level 1 (L1) tag lookup involves a comparison encompassing a large number of bits. To address the power consumed by the wide comparators need for traditional L1 cache tag lookup, traditional cache tags have been replaced with a vector pointing to an entry in a fully associative translation lookaside buffer (TLB). This configuration, however, constrains the size of the TLB and results in undesirably frequent TLB misses.

DESCRIPTION OF EMBODIMENTS

Figure 1:
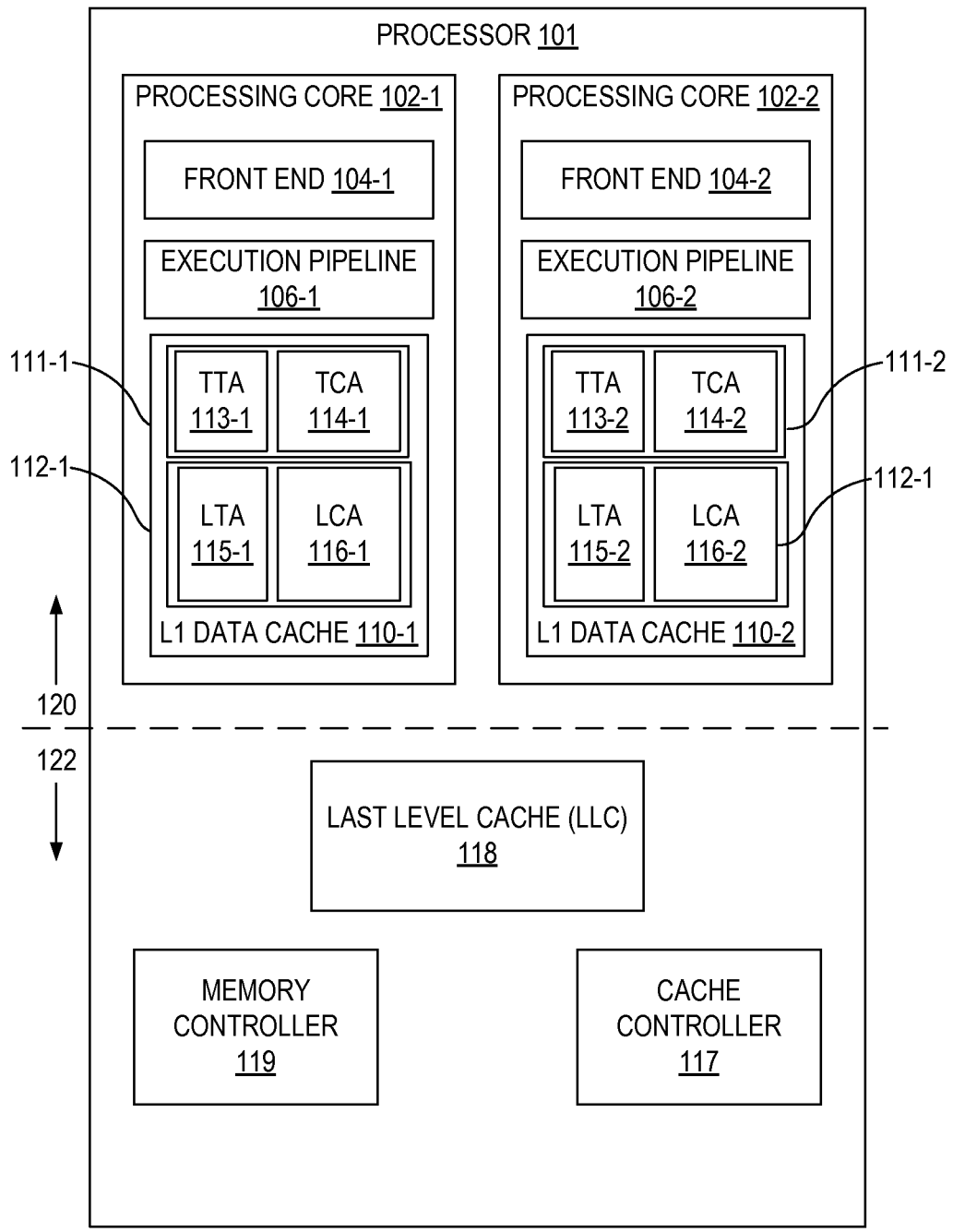
FIG. 1 illustrates a multi-core processor used in conjunction with at least one embodiment.

Embodiments described herein pertain to implementing a tag structure for a cache memory that includes a multi-way, set-associative TLB. In at least one embodiment, the tag structure stores vectors, rather than traditional address tags, in an L1 tag array to enable a tag lookup that has fewer bits per entry and consumes less power. In at least one embodiment, the vectors identify entries in a TLB tag array (TTA). When a virtual memory address associated with a memory access instruction, e.g., a load or a store instruction, hits in the TLB, at least one embodiment of the TLB generates a vector identifying the set and the way of the TLB entry that matched. Embodiments of disclosed tag structures present this generated TLB vector to the L1 tag array and compare the generated TLB to TLB vectors stored in the way entries of a set in the L1 tag array. If the generated TLB vector matches one of the vectors stored in the way entries of the L1 tag array, then in at least one embodiment, a cache hit is indicated and the L1 comparator generates an indicator (e.g., a one-hot vector) of the way entry that matches. This way-select indicator may be used to select the applicable cache line from the L1 content array in at least one embodiment.

In at least one embodiment, an L1 data cache includes a TLB and a cache array. The TLB includes a TLB tag array and a TLB content array. The cache array includes an L1 tag array and an L1 content array. In some embodiments, the TLB and the cache array are both set associative, multi-way structures wherein each includes a plurality of sets and each set is associated with a group of way entries or, more simply, ways, where the number of entries might be 2, 4, 8, 16, and so forth, although configurations with any number of way entries may be accommodated. The TLB may have fewer sets than the cache array, but in at least one embodiment, the structures of the TLB and the cache array share the same number of way entries.

In at least one embodiment, the cache memory includes tag structure logic to store TLB vectors in the L1 tag array, where a TLB vector identifies an entry of the TLB content array with a tag that matches the virtual memory address, i.e., the TLB vector in the L1 tag array points back to an entry in the TTA that contains an address translation for the applicable address. In at least one embodiment, the TLB receives virtual memory addresses and the TLB content array stores the corresponding physical memory addresses or tag portions of the physical memory addresses.

In at least one embodiment, when a TLB hit occurs, the TLB vector generated TLB comparator is compared to the vectors stored in the way entries associated with the L1 tag array sets to determine a cache hit. The L1 tag array set may be determined from a portion of the virtual memory address. For example, if the cache array has 64 sets, 6 bits of the virtual memory address may be decoded to identify the applicable L1 tag array set. Similarly, a portion of the virtual memory address may be used to identify the appropriate set in the TLB structures. In at least one embodiment, the virtual memory address bits that identify the TLB set are independent of the virtual memory address bits that identify the L1 tag array set.

In at least one embodiment, the TLB vectors stored in the L1 tag array have fewer bits than the physical address tags stored in the TLB content array. By requiring comparison of fewer bits, the way selection comparison beneficially draws less power than a physical address tag comparison would require.

In at least one embodiment, a method of looking up a virtual memory address in an L1 data cache includes determining a TLB set associated with a virtual memory address indicated in a memory access instruction and comparing a TLB tag portion of the virtual memory address with TLB tags stored in way entries of a TLB tag array, where the way entries are associated with the TLB set. When the TLB tag portion of the virtual memory address matches a TLB tag stored in the way entries, at least one embodiment of the method includes generating a TLB vector indicative of the TLB set and the way entry that matched. In some embodiments, a set in an L1 tag array is identified based on L1 tag array set selection bits of the virtual memory address and the TLB vector is compared with TLB vectors stored in way entries of an L1 tag array, wherein the L1 tag array way entries are associated with the L1 tag array set. In some embodiments, when the TLB vector matches a stored TLB vector in one of the L1 tag array way entries, a way select output indicative of the L1 tag array set is generated and the L1 tag array way entry that matched.

If the TLB tag portion of the virtual memory address does not match any of the TLB tags stored in the way entries, i.e., the virtual memory address misses in the TLB, some embodiments may identify one of the existing way entries for replacement, store the TLB tag portion of the virtual memory address in a TLB tag array entry associated with the TLB set and the way entry identified, and obtain a physical memory address associated with the virtual memory address, e.g., from a page table structure operable to "walk" the page table to produce a physical memory address from a virtual memory address. In some embodiments, a tag portion of the physical memory address may be stored in an entry of a TLB data array, where the TLB data array entry is associated with the TLB set and the way entry identified.

In at least one embodiment, when a TLB tag array entry containing a TLB vector in the L1 tag array is replaced, all L1 tag array entries that have the same L1 tag array are also invalidated to prevent unintended references between the TLB and the cache array. This process of identifying L1 tag array entries containing the same TLB vector may be facilitated by a content addressable storage array. In at least one embodiment, the storage array may include an encoded representation of the TLB set and an encoded representation of the TLB way for each cache tag data array.

In some embodiments, the TLB vector itself may include a TLB set component indicative of the TLB set and a TLB way component indicative of the applicable way entry in the TLB tag array. The TLB set and way components may be indicated in an encoded or decoded manner. In at least one embodiment, the way component is decoded and the set component is encoded. In an embodiment that employs, as an example, a 16-entry, 8-way TLB, the set component of the TLB vector may be encoded (4 bits) while the way component may be decoded (8 bits) so that the TLB vector is 12 bits in total. Encoded representation of the way component may beneficially speed a subsequent use of the way component to access an entry in the cache content array. In at least one embodiment, a physical memory address or a portion thereof may be stored in the L1 tag array instead of a TLB vector when, for example, a physical memory access is detected.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring now to the drawings, FIG. 1 illustrates an embodiment of a processor 101 suitable for implementing a vectored tagging L1 cache as described herein. The FIG. 1 embodiment of processor 101 includes a core region 120 and an uncore 122. Core region 120 includes multiple processing cores 102, but disclosed functionality is applicable to single core processors as well. The FIG. 1 embodiment of processor 101 includes a first processing core 102-1 and a second processing core 102-2, but other embodiments may include more or fewer processing cores.

The FIG. 1 embodiment of processing cores 102 includes a front-end 104, an execution pipeline 106, and a cache memory designated as L1 data cache 110. The designation of the depicted cache memory as L1 data cache indicates that the cache is dedicated for caching data rather than instructions and is the cache that is architecturally closest to execution engine 106. Cache tagging and lookup structures and techniques described herein are especially applicable to an L1 data cache, but may be employed in conjunction with instruction caches, hybrid caches, and L2 and higher caches.

In at least one embodiment, front-end 104 is operable to fetch instructions from an instruction cache (not depicted) and schedule the fetched instructions for execution. In the FIG. 1 embodiment, execution pipeline 106 may include logic and microcode to decode and execute various mathematical, logical, memory access, and flow control instructions. Thus, front-end 104 may be responsible for ensuring that a steady stream of instructions is fed to execution pipeline 106 while execution pipeline 106 may be responsible for executing instructions and processing the results. In some embodiments, execution pipeline 106 may include two or more arithmetic pipelines in parallel, two or more memory access or load/store pipelines in parallel, and two or more flow control or branch pipelines. Execution pipelines 106 may further include one or more floating point pipelines. In some embodiments, execution pipelines 106 may include register and logical resources for executing instructions out of order, executing instructions speculatively, or both.

The cache tagging and lookup subject described herein is primarily applicable to memory access instructions. During execution of memory access instructions, execution pipeline 106 attempts to execute the instruction by accessing a copy of data stored in the applicable memory address residing in the lowest level cache memory of a cache memory subsystem that may include two or more cache memories arranged in a hierarchical configuration. In the FIG. 1 embodiment, depicted elements of the cache memory subsystem include the L1 data caches 110 and an LLC 118 in the uncore 122. Other elements of the cache memory subsystem may include a per-core instruction cache (not depicted) that operates in conjunction with front end 104 and one or more per-core intermediate caches (not depicted).

In at least one embodiment, the cache memory subsystem for processor 101 includes L1 data and instruction caches per-core, an intermediate or L2 cache memory per-core that includes both instructions and data, and the LLC 118, which includes instructions and data and is shared among multiple processing cores 102. If a memory access instruction misses in the L1 data cache, execution of the applicable program or thread may stall or slow while the cache memory subsystem accesses the various cache memories until a copy of the applicable memory address is found.

The FIG. 1 embodiment of L1 data cache 110 includes a translation lookaside buffer (TLB) 111 and a cache array 112. The FIG. 1 embodiment of TLB 111 includes a TLB tag array (TTA) 113 and a TLB content array (TCA) 114. The FIG. 1 embodiment of cache array 112 includes an L1 tag array (LTA) 115 and an L1 content array (LCA) 116. In addition, the FIG. 1 embodiment of L1 data cache 110 includes tagging and lookup logic referred to herein L1 data cache 110.

In at least one embodiment, L1 data cache 110 includes tagging and lookup logic that generates and stores vectors, referred to herein as TLB vectors, rather than address tags, in L1 tag array 115. The TLB vectors stored in LTA 115, in at least one embodiment, have fewer bits than a traditional address tag would have. In some embodiments, TLB vectors stored in LTA 115 identify an entry in the TLB 111. For example, a virtual memory address included in a memory access instruction executing in execution engine 106 will be provided to TLB 111.

In at least one of the embodiments described herein, TLB 111 and cache array 112 are both set associative, multiple way structures in which the array includes a plurality of rows or sets and wherein each set is associated with a group of columns or way entries, sometimes referred to simply as ways. Generally, there is a mapping between a memory address and a set such that, given the address, one can identify the applicable set. Conversely, the different ways associated with a particular set are address indifferent or agnostic, but an address can be associated with only one way at any given time. Thus, in an N-way, set associative structure, a memory address can be associated with any of the N way entries associated with the one and only one set to which the address maps. If the virtual memory address hits in TLB 111, the address will hit to an entry at a specific set and a specific way. This entry can therefore be identified by a 2-element vector that includes a set component indicating the set and a way component indicating the way.

In the FIG. 1 embodiment of processor 101, first processing core 102-1 and second processing core 102-2 may communicate via a shared bus, a point-to-point interconnection, or in some other manner. The FIG. 1 embodiment of uncore 122 includes a cache controller 117 to implement a cache coherency policy and, in conjunction with a memory controller 119, maintain coherency between a system memory (not depicted) and the various cache memories.

Figure 2:
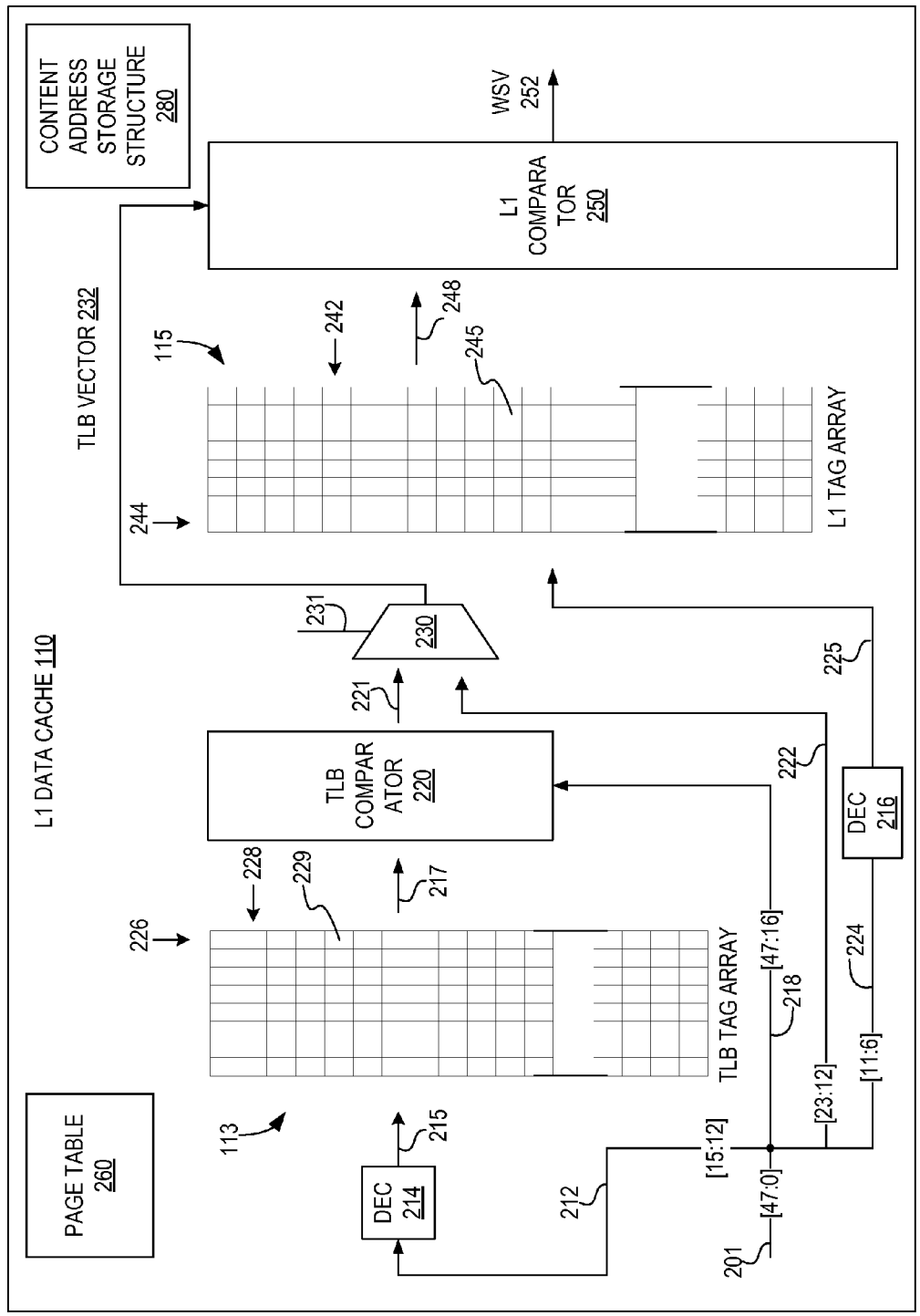
FIG. 2 illustrates an L1 data cache configuration used in conjunction with at least one embodiment.

FIG. 2 illustrates one embodiment of L1 data cache 110. The FIG. 2 embodiment of L1 data cache 110 includes an N-way, set associative TLB 111 including a TTA 113 that stores tags for TCA 114 (FIG. 1). In the FIG. 2 embodiment, TLB 111 operates in conjunction with a comparator 220, to generate a vector output 221. When the virtual memory address hits, vector output 221 indicates an entry in TTA 113, that matched. This entry information may be provided as a vector having two elements including a first element that conveys the TTA way 226 and TTA set 228 corresponding to an entry in TTA 113 that provided a match to an address.

As depicted in FIG. 2, L1 data cache 110 receives a 48-bit memory address 201 from a load/store unit in an execution pipeline 106 (FIG. 1). In at least one embodiment, memory addresses include virtual memory addresses and physical memory addresses. In the embodiments illustrated herein, execution pipelines 106 execute memory access instructions that contain virtual memory address references and the virtual memory addresses are provided to L1 data cache 110 to determine whether the memory address is cached in L1 data cache 110.

L1 data cache 110 processes subsets of these bits including subsets identified by reference numerals 212, 218, 222, and 224, with each subset indicating which specific bits are included. In the FIG. 2 embodiment, a subset of virtual memory address bits identified as TLB way select bits 212 includes virtual memory address bits 12-15. Similarly, the FIG. 2 embodiment includes TLB tag compare bits 218 comprising virtual memory address bits 16-47, and L1 tag array set selection bits 224 comprising virtual memory address bits 6-11. Although FIG. 2 depicts the specific bits included in each subset of bits, other implementations may include more or fewer bits. Similarly, although FIG. 2 is described with respect to a 48-bit virtual memory address processed in three or more subsets as shown, other embodiments may feature a memory address having a different numbers of bits and may employ more or fewer subsets.

In the FIG. 2 embodiment, TLB 111 is a multiple way, set associative cache that includes a plurality of TTA sets 228 and a plurality of TTA ways 226. The combination of a specific TTA set 228 and a specified TTA way 226 identifies a single TTA entry 229.

Figure 3:
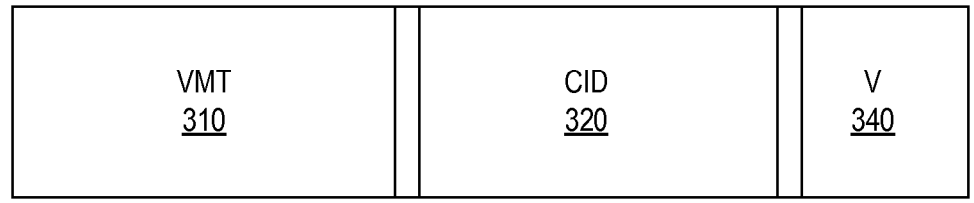
FIG. 3 illustrates an embodiment of a tag used in a TLB tag array used in conjunction with at least one embodiment.

Referring momentarily to FIG. 3, one embodiment of a TLB entry 229 is illustrated. In the FIG. 3 embodiment, TLB entry 229 includes a virtual memory tag 310, a context identifier (CID) 320, and a valid (V) bit 340. The virtual memory tag 310 may include a portion of the bits in the virtual memory address 201 not accounted for by the structure of the cache. For example, with respect to the 16-set, 8-way TTA 113, a 48-bit virtual memory address 201, and an L1 data cache 110 employing 64 byte cache lines, 6 bits are accounted for by the cache line size, 6 bits are accounted for by the 64 sets in the LTA 115, and 4 bits are accounted for by the 16 sets in the TTA 113, for a total of 16 bits, leaving 32 bits for the virtual tag. For this embodiment, the virtual memory tag 310 includes the 32 most significant bits of virtual memory address 201. TLB way set select bits 212 of virtual memory address 201 are decoded by decoder 214 to produce a TLB set selection signal 215 identifying, selecting, or otherwise indicating one of the TTA sets 228. In the FIG. 2 embodiment, in which TLB way set select bits 212 include 4 bits (bits 12-15) of memory address 201, TLB set selection signal 215 can indicate any one of 16 TTA sets 228.

The depicted embodiment of TTA 113 generates a TTA set output 217 that includes each of the way entries 229 for the TTA set 228 identified by TLB set selection signal 215. In the FIG. 2 embodiment, in which TTA 113 is an 8-way table, TTA set output 217 includes the 8 entries 229 of the TTA set 228 indicated by TLB set selection signal 215.

TTA set output 217 is provided as one input to TLB comparator 220. In the FIG. 2 embodiment, tag compare bits 218, which includes bits 16-47 of memory address 201, provide a second input to TLB comparator 220. TLB comparator 220 includes an 8×1 comparator that compares each of the 8 TTA way entries 229 in TTA set output 217 to the tag compare bits 218 of memory address 201. In the FIG. 2 embodiment, TLB comparator 220 generates a vector output 221 when memory address 201 is an address that hits in TLB 111 and vector output 221 indicates which entry 229 matched tag compare bits 218. In at least one embodiment, vector output 221 indicates the matching entry with a 2-element vector that includes a set component and a way component. The set component indicates which of the TTA sets 228 contains the matching entry while the way component indicates which of the TTA ways 226 contains the matching entry.

If a TLB miss occurs, i.e., if memory address 201 is not an address that produces a match in TLB comparator 220, memory address 201 is provided to a page table 260, which "walks" memory address 201 through an address translation process according to any of a number of well-known processes, to generate a physical memory address 261 corresponding to virtual memory address 201. L1 data cache 110 may then cache the physical memory address 261 in TLB 111 by selecting an entry 229 in TTA 113 for eviction. The entry 229 selected for eviction may be from any of the TTA ways 226 in the appropriate TTA set 228 (i.e., the TTA set 228 indicated by the TLB way select bits 212). The entry 229 selected for eviction is then filled with the tag compare bits 218 of the system memory address 201 that produced the TLB miss.

When an entry 229 in TTA 113 is evicted and replaced, e.g., after a TLB miss, LTA 115 must be updated as well. Updating LTA 115 in response to an eviction and replacement of an entry in TTA 113 may, however, require the invalidation of more than one entry in LTA 115. Remembering that each way-entry 245 in LTA 115 is a vector that identifies an entry 229 in TTA 113, invalidating an entry 229 in TTA 113 necessitates the invalidation of every way-entry 245 in LTA 115 that refers to the invalidated TTA entry. LTA 115 may have as many as one such entry in each set 242 of LTA 115. To facilitate the invalidation process, at least one embodiment of L1 data cache 110 includes a content address storage structure 280 that replicates the way and set structure and the contents of LTA 115. When a TLB miss occurs or an entry in TTA 113 is otherwise invalidated, the TLB vector that represents the evicted TTA entry is used to address the content address storage structure 280, which generates the locations of all entries containing the applicable vector. L1 data cache 110 may then invalidate all way-entries 245 in LTA 115 identified by content addressable storage structure 280.

When virtual memory address 201 hits in TLB 111, the FIG. 2 embodiment of TLB comparator 220 generates vector output 221 as described previously. Vector output 221, which indicates a set and a way of TTA 113, is provided to a multiplexer 230. Multiplexer 230 is gated by a control signal 231. When vectored tagging is enabled, control signal 231 gates vector output 221 to L1 comparator 250 as TLB vector 232. When vectored tagging is disabled, the depicted embodiment gates virtual memory tag bits 222, comprising system memory address bits 12-23, through multiplexer 230. This configuration may be used to bypass vectored tagging and index cache array 112 with an address tag.

In the FIG. 2 embodiment, TLB vector 232 includes a set component, indicating a set 228 of TTA 113, and a way component indicating a way 226 of TTA 113. In at least one embodiment, the set component is indicated in encoded form (4-bit binary) while the way component is indicated in decoded form, also referred to as a one-hot vector form, in which the way is indicated explicitly as the only "1" in an 8-bit field. Other embodiments may employ a decoded way component and an encoded set component, both components encoded, or both components decoded.

Figure 4:
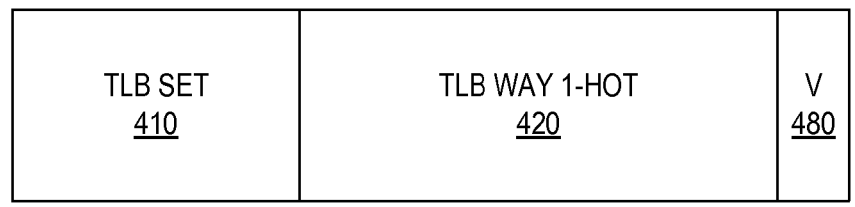
FIG. 4 illustrates an embodiment of a vectored tag used in an L1 tag array of at least one embodiment.

In the FIG. 2 embodiment, TLB vector 232 is provided as a first input to L1 comparator 250 and LTA 115 generates L1 set output 248, which provides a second input to L1 comparator 250. L1 set output 248 includes each of the 8 way-entries 245 of the L1 tag array set 242 indicated by L1 set selection signal 225. Referring to FIG. 4, one embodiment of way-entries 245 include a TLB set component 410, and an encoded or one-hot representation 420 of the TLB way, and a valid (V) bit 480. Returning to FIG. 2, L1 tag array set selection signal 225 is generated by decoder 216 based on set selection bits 224, which includes bits 6-11 of virtual memory address 201 in the FIG. 2 embodiment.

In the FIG. 2 embodiment, L1 comparator 250 performs an 8×1 comparison of TLB vector 232 against each of the 8 stored vectors in the selected set of LTA 115. When virtual memory address 201 is an address that hits in cache array 112, TLB vector 232 will match one of the 8 way-entries 245 contained in L1 tag array set output 248 and the embodiment of comparator 250 depicted in FIG. 2 may generate a way-select signal 252 identifying which of the 8 L1 tag array ways 244 produced the match. Way select signal 252 may be provided in encoded or decoded form, but the FIG. 2 embodiment employs a decoded form in which way select signal 252 is an 8-bit one-hot vector identifying one of 8 ways in LTA 115. Way select signal 252 is provided to LCA 116 to select the applicable way as LCA 116 is accessed (not depicted in FIG. 2).

When virtual memory address 201 is an address that misses in LTA 115, a replacement policy is invoked to identify a line in LCA 116 for invalidation. The replacement policy can be a least recently used (LRU) policy, a pseudo LRU, or any other suitable replacement policy. Since the L1 tag array set 242 associated with any memory address is determined from the memory address, identifying a line to invalidate means identifying one of the 8 way-entries 245 associated with the applicable L1 tag array set 242. After identifying a line to invalidate and writing back any modified data in the identified line, the identified line may be invalidated. When the data associated with the requested line fill returns, the data is cached in the invalidated entry of LCA 116. With respect to managing the entries in LTA 115, the TLB vector 232 that produced the miss may be stored in the L1 tag array way entry 244 corresponding to the L1 content array entry that was invalidated and filled.

Figure 5A:
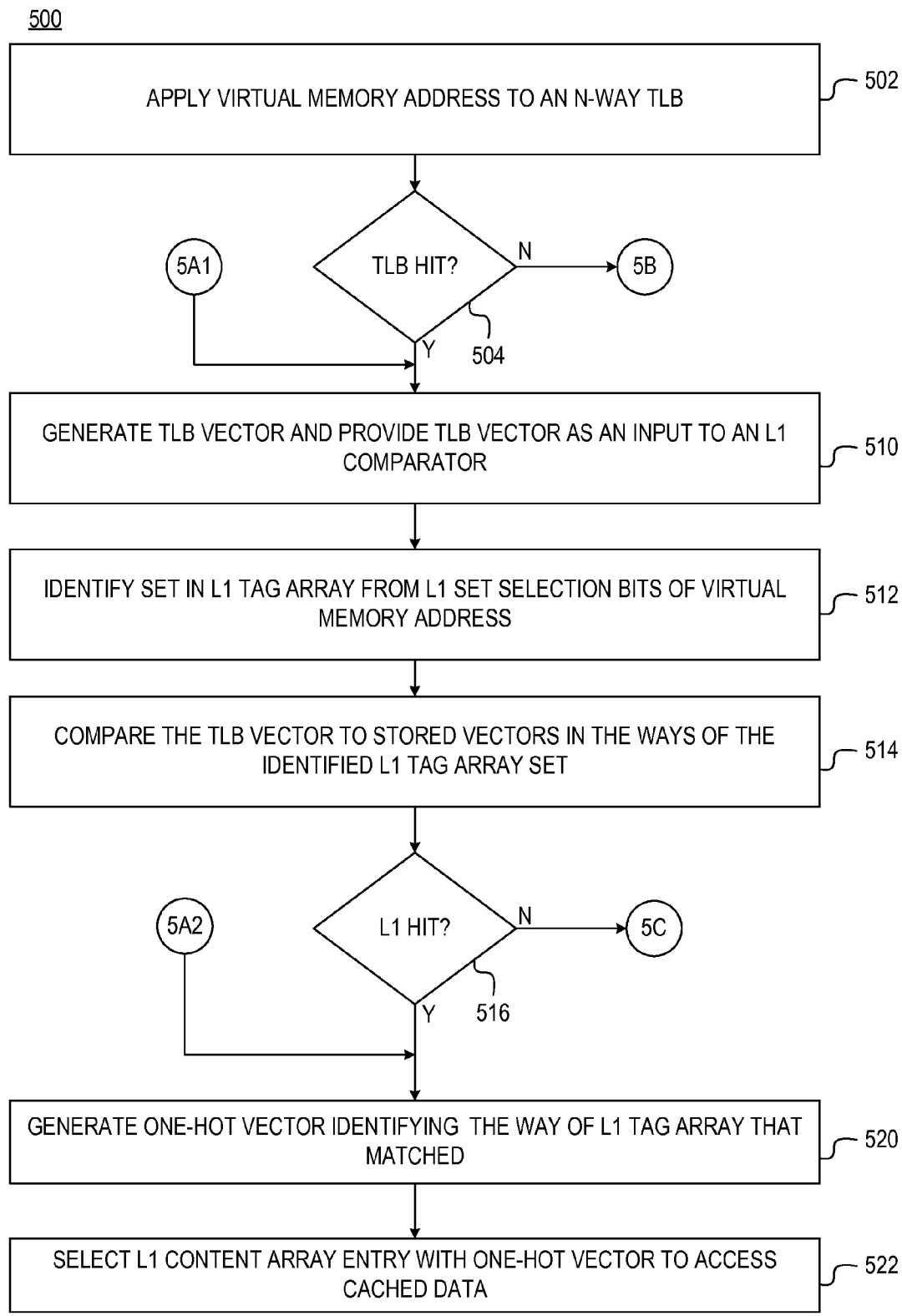
FIGS. 5A, 5B, and 5C illustrate an embodiment of a method for performing an L1 data cache lookup.
Figure 5B:
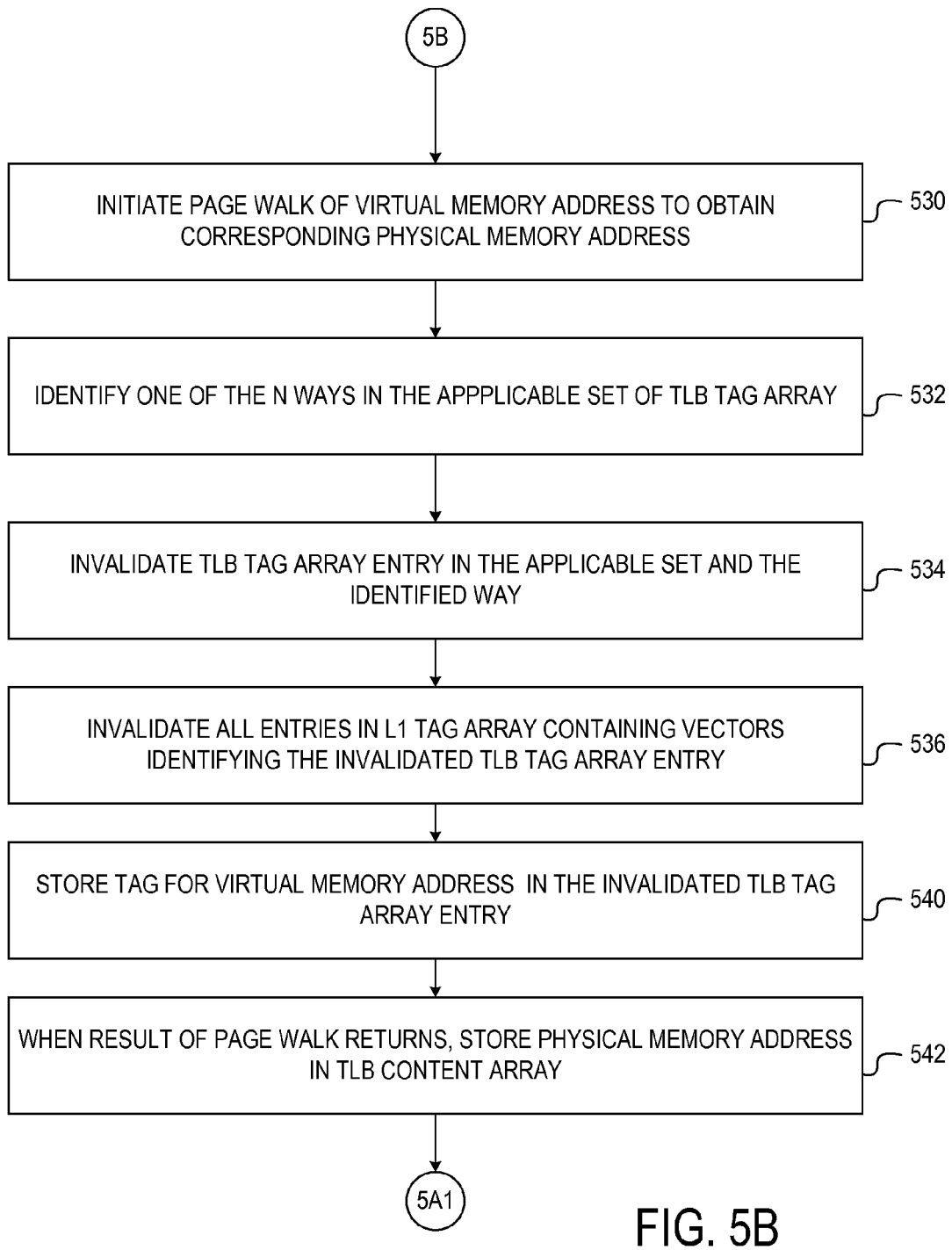

Referring now to FIG. 5, one embodiment of a method 500 of implementing an L1 tag array with tag vectors is illustrated. In the FIG. 5 embodiment of method 500, a virtual memory address referenced in a memory access instruction executing in an execution pipeline, e.g., virtual memory address 201 (FIG. 2), is provided (operation 502) to the TLB for address lookup. If the virtual memory address misses in the TLB, as determined in operation 504, method 500 jumps to a TLB miss sequence at node 5B (FIG. 5B) in the FIG. 5 embodiment.

Figure 5C:
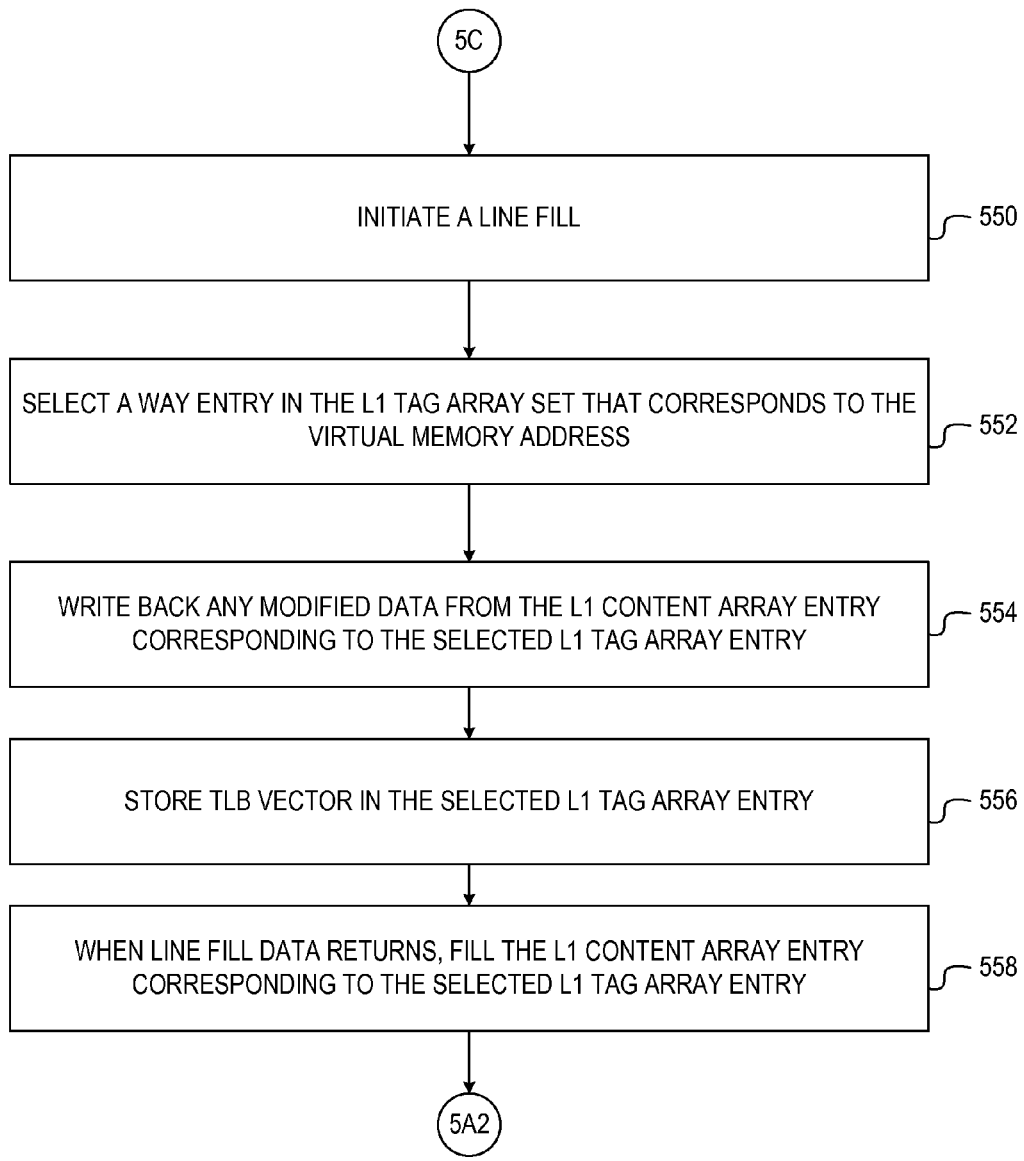

If the virtual memory address hits in the TLB, a TLB vector indicating the set and way of the matching TTA entry is generated (operation 510) in the FIG. 5 embodiment and provided as a first input to an L1 comparator. In the FIG. 5 embodiment, L1 set selection bits in the virtual memory address are decoded to identify (operation 512) a set in an L1 tag array. The TLB vector generated in operation 510 is compared (operation 514) to stored vectors in the way entries of the L1 tag array set identified in operation 512. In the FIG. 5 embodiment, if, as determined in (operation 516), one of the stored vectors matches the TLB vector, an L1 cache hit is indicated, and method 500 continues in FIG. 5A. If none of the stored vectors matches the TLB vector, an L1 miss is indicated and method 500 jumps to an L1 miss sequence at node 5C (FIG. 5C). When an L1 hit is indicated, the FIG. 5A embodiment of method 500 generates (operation 520) way select information indicating which L1 tag array way produced the L1 hit. The way select information is forwarded to the L1 content array to select (operation 522) the L1 content array entry that contains the data indicated in the memory access instruction, i.e., the entry that stores the cached copy of the data stored in the memory address indicated in the instruction. In the FIG. 5 embodiment, the way selection information is indicated in decoded form such as a one-hot vector to streamline the L1 content array access.

Referring now to FIG. 5B, one embodiment of operations executed following determination of a TLB miss in operation 504 is illustrated. The FIG. 5B embodiment includes initiating (operation 530) a page walk of the virtual memory address to obtain a corresponding physical memory address from a page table. The techniques for walking a page table to translate a virtual memory address into a physical memory address are well known in the field of microprocessor architecture and are not further described herein. Because the virtual memory address missed in the TLB, the TLB will be updated to cache the virtual memory address in the TTA and the corresponding physical memory address in the TLB content array.

In the embodiment illustrated in FIG. 5B, caching a virtual memory address that missed in the TLB includes selecting or otherwise identifying (operation 532) one of the way entries of the applicable TTA set, i.e., the TTA set indicated by TLB set selection bits in the virtual memory address, as the way entry to be replaced. The selection of a way entry to be replaced may be based on an LRU policy, a pseudo LRU policy, or another suitable replacement policy. As illustrated in FIG. 5, the TTA entry identified for replacement is invalidated (operation 534).

As discussed previously, the L1 tag array may include multiple entries that contain the same vectored tag because as many as one entry per L1 tag array set can refer to the same entry in the TTA. Thus, after invalidating, in operation 534, the TTA entry that was selected for replacement, the embodiment of method 500 illustrated in FIG. 5B identifies and invalidates (block 536) all entries in the L1 tag array that contain a vector identifying the invalidated TTA entry. The process of identifying all L1 tag array entries containing a specific vector may be facilitated by accessing a content addressable memory that replicates the structure and content of the L1 tag array.

FIG. 5B further depicts storing (operation 540) a tag for the virtual memory address that caused the TLB miss in the TLB entry that was selected for replacement and storing (operation 542) a physical memory address in the TLB content array following the page walk. In at least one embodiment, the TTAs entries contain tags for the applicable virtual memory addresses. In one embodiment, for example, the tags stored in the TTA entries include the upper 32 most significant bits of the virtual memory address.

Referring now to FIG. 5C, elements of method 500 executed or performed when the virtual memory address misses in the L1 cache in (operation 518) of FIG. 5A are presented. As illustrated in FIG. 5C, a line fill is initiated (operation 550) when the virtual memory address misses in the L1 cache. The line fill request includes a request to provide a line of data corresponding to the virtual memory address that produced the L1 cache miss. In at least some embodiments, virtual memory addresses are not employed in the memory hierarchy except at the L1 tier. In these embodiments, the request to initiate the line fill indicates the physical memory address associated with the virtual memory address. The physical memory address may be obtained from the TLB content array entry corresponding to the TLB tag parade entry that produced the TLB hit.

The FIG. 5C elements of method 500 include selecting a way entry in the L1 tag array sent that corresponds to the virtual memory address. The selection of a way entry (operation 552) represents a selection of a cache line to be evicted and replaced when the requested cache line is returned. As discussed with respect to the selection of an entry in the TTA when a TLB this occurs, the selection and replacement policy may be an LRU policy, a pseudo LRU policy, or another suitable replacement policy.

If the entry selected for replacement is a modified entry, the FIG. 5C embodiment includes writing back (operation 554) the modified data from the L1 content array entry corresponding to the selected L1 tag array entry. In the embodiment depicted in FIG. 5C, the TLB vectors generated by the TLB comparator are stored in the L1 tag array entry that was selected to hold the new address. (operation 556). When the data associated with the line fill initiated in operation 550 returns, the selected entry in the L1 content array is filled (operation 558).

The embodiment of method 500 illustrated in FIGS. 5A, 5B, and 5C proceeds to the L1 lookup only if a TLB hit occurs and the TLB comparator generates a TLB vector. Other embodiments may include contingencies for proceeding with the L1 lookup when a TLB miss occurs. For example, one embodiment (not depicted) may suspend the vector tag lookup in the L1 cache following a TLB miss. Instead, this embodiment may look up the L1 cache array with the physical memory address when the physical memory address is produced following the page walk.

Figure 6:
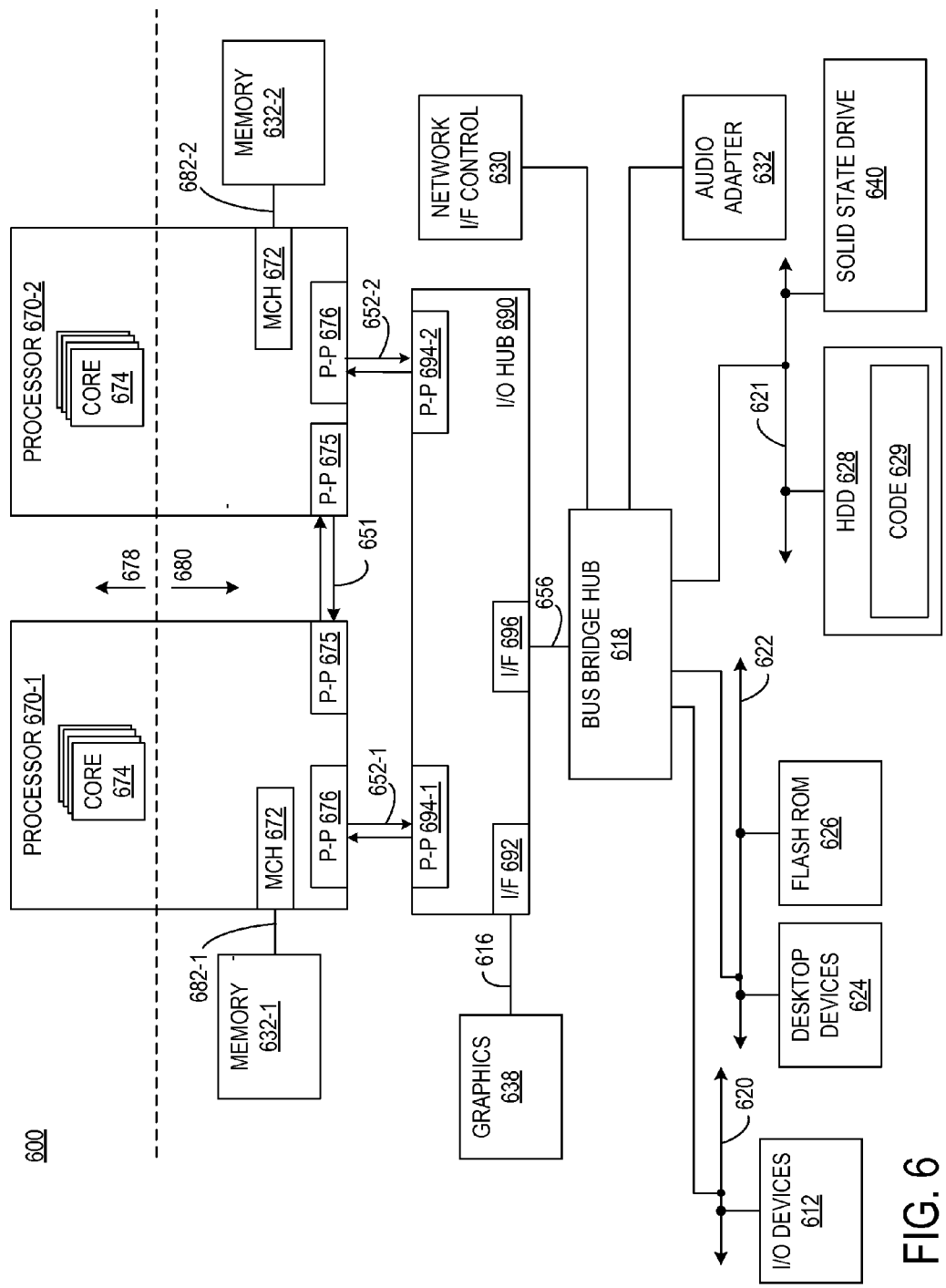
FIG. 6 illustrates a computer system used in conjunction with at least one embodiment.

Embodiments may be implemented in many different system types. Referring now to FIG. 6, a block diagram of selected elements of a processor system in accordance with an embodiment of the present disclosure is illustrated. FIG. 6 shows a system in which a processor, memory, and input/output devices are interconnected by a number of point-to-point (P-P) interfaces, as will be described in further detail. However, in other embodiments (not shown in FIG. 6), the processor system may employ different bus architectures, such as a front side bus, a multi-drop bus, and/or another implementation. Although a processor is depicted in the example embodiment of FIG. 6 for descriptive clarity, in various embodiments, a different number of processors may be employed using elements of the depicted architecture.

Embodiments may be implemented in many different system types and platforms. Referring now to FIG. 6, a computer system 600 in which at least one embodiment of an L1 data cache that supports vectored tagging in a multiple way TLB as described herein may be included is illustrated. The FIG. 6 embodiment of system 600 is a multi-processor system that include a first processor 670-1 and a second processor 670-2. Although FIG. 6 depicts two processors 670, other embodiments may include more or fewer processors. The FIG. 6 embodiment of processors 670 includes a core region 678 and an integration region 680. Core region 678 includes one or more processing cores 674 while the depicted embodiment of integration region 680 includes a memory controller hub (MCH) 672, a processor-hub point-to-point interface 676, and a processor-processor point-to-point interface 675.

Processing cores 674 may each include hardware and firmware resources (not depicted) to support an execution pipeline. These resources may include, as examples, a cache memory hierarchy, which may include a dedicated level one (L1) instruction cache, a dedicated L1 data cache, a level 2 (L2) data/instruction cache, or a combination thereof, prefetch logic and buffers, branch prediction logic, decode logic, a register file, various parallel execution resources including arithmetic logic units, floating point units, load/store units, address generation units, a data cache, and so forth.

In the FIG. 6 embodiment, MCH 672 supports bidirectional transfer of data between a processor 670 and a system memory 632 via a memory interconnect 682. System memory 632 may be a double-data rate (DDR) type dynamic random-access memory (DRAM) while memory interconnect 682 and MCH 672 may comply with a DDR interface specification. System memory 632-1 may represent a bank of memory interfaces (or slots) that may be populated with corresponding memory circuits for a desired DRAM capacity.

In the multi-processor system 600, each processor 670 includes an MCH 672 to communicate with a portion of system memory 632 that is local to processor 670. For example, system memory 632-1 is local to processor 670-1 and represents a portion of the system memory 632 as a whole. In the FIG. 6 embodiment, system 600 is a distributed memory multiprocessor system in which each processor 670 can access each portion of system memory 632, whether local or not. While local accesses may have lower latency, accesses to non-local portions of system memory 632 are permitted.

In FIG. 6, each processor 670 also includes a point-to-point interface 675 that supports communication of information with a point-to-point interface 675 of one of the other processors 670 via an inter-processor point-to-point interconnection 651. In some embodiments, processor-hub point-to-point interconnections 652 and processor-processor point-to-point interconnections 651 are distinct instances of a common set of interconnections. In other embodiments, point-to-point interconnection 652 may differ from point-to-point interconnection 651.

The FIG. 6 processors 670 include point-to-point interfaces 676 to communicate via point-to-point interconnect 652 with a point-to-point interface 694 of an I/O hub 690. In the FIG. 6 embodiment, I/O hub 690 includes a graphics interface 692 to support bidirectional communication of data with a graphics adapter 638 via a graphics interconnection 616, which may be implemented as a high speed serial bus, e.g., a peripheral component interconnect express (PCIe) bus or another suitable bus.

The FIG. 6 embodiment of I/O hub 690 also communicates, via an interface 696 and a corresponding interconnection 656, with a bus bridge hub 618 that supports various bus protocols for different types of I/O devices or peripheral devices. The FIG. 6 embodiment of bus bridge hub 618 supports, as examples, a network interface controller (NIC) 630 that implements a packet-switched network communication protocol (e.g., Gigabit Ethernet), a sound card or audio adapter 632, and a low bandwidth bus 622 (e.g., low pin count (LPC), I2C, Industry Standard Architecture (ISA)), to support legacy interfaces referred to herein as desktop I/O devices 624 that might include, as examples, interfaces for a keyboard, mouse, serial port, parallel port, and a removable media drive. The FIG. 6 embodiment of low bandwidth bus 622 further includes an interface for a nonvolatile memory (NVM) device such as flash read only memory (ROM) 626 depicted, and other low bandwidth I/O devices 612 (e.g., keyboard mouse, or other I/O device), and a storage protocol bus 621 (e.g., serial AT attachment (SATA), small computer system interface (SCSI)), to support persistent storage devices including conventional magnetic core hard disk drives (HDD) 628. HDD 628 is depicted as including store code 629, which may represent processor executable instructions including operating system instructions, application program instructions, and so forth, that, when executed by the processor, cause the processor to perform operations described herein.

The FIG. 6 embodiment of system 600 also includes an "HDD-like" semiconductor-based storage resource referred to as solid state drive 640, and a general purpose serial communication bus 620 (e.g., USB, PCI, PCIe) to support various devices. Although specific instances of communication busses and bus targets have been depicted and described, other embodiments may employ different communication busses and different target devices.

Figure 7:
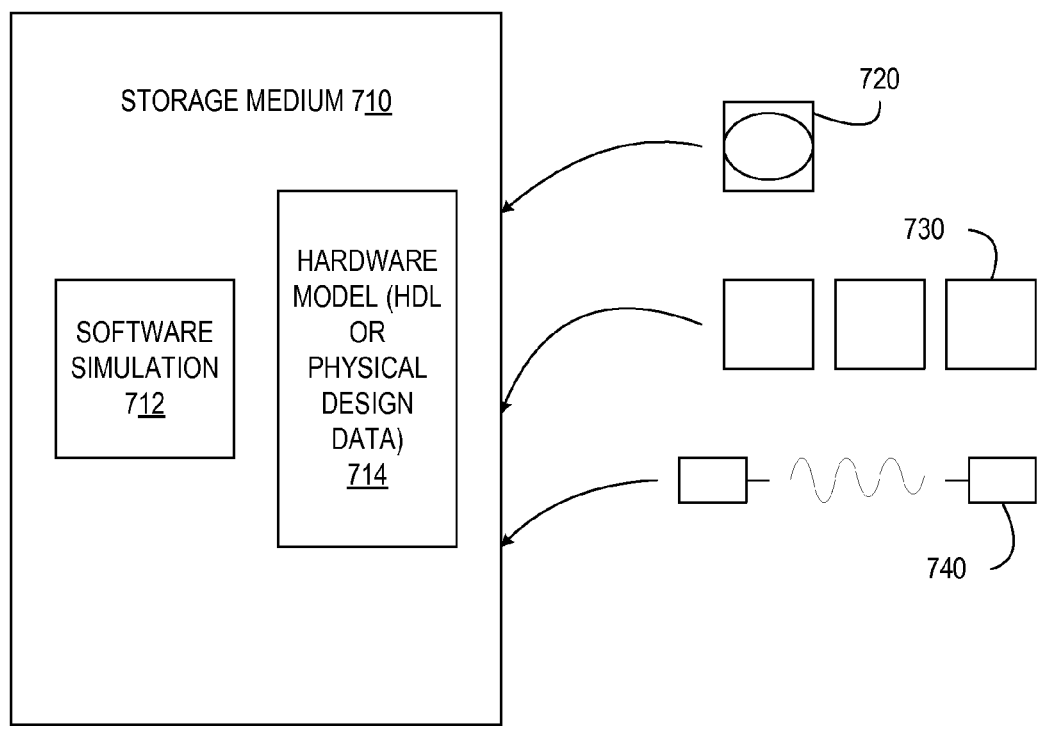
FIG. 7 illustrates a representation for simulation, emulation, and fabrication of a design implementing the disclosed techniques.

Referring now to FIG. 7, a representation for simulation, emulation and fabrication of a design implementing the disclosed techniques is illustrated. Data representing a design may represent the design in a number of manners. First, as is useful in simulations, the hardware may be represented using a hardware description language or another functional description language which basically provides a computerized model of how the designed hardware is expected to perform. The hardware model 714 may be stored in a storage medium 710 such as a computer memory so that the model may be simulated using simulation software 712 that applies a particular test suite to the hardware model 714 to determine if it indeed functions as intended. In some embodiments, the simulation software 712 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 740 modulated or otherwise generated to transmit such information, a memory 730, or a magnetic or optical storage 720 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

EXAMPLES

The following examples pertain to further embodiments.

Example 1 is a method for implementing a tag structure comprising: (i) determining a translation lookaside buffer (TLB) set associated with a virtual memory address indicated in a memory access instruction; (ii) comparing a TLB tag portion of the virtual memory address with TLB tags stored in way entries of a TLB tag array, wherein the way entries are associated with the TLB set; (iii) generating, when the TLB tag portion matches a TLB tag stored in one of the way entries, a TLB vector indicative of the TLB set and the way entry that matched; (iv) identifying a set in a level 1 (L1) tag array based on the virtual memory address; (v) comparing the TLB vector with stored TLB vectors stored in way entries of a L1 tag array, wherein the L1 tag array way entries are associated with the L1 tag array set; and (vi) when the TLB vector matches a stored TLB vector in one of the L1 tag array way entries, generating a way select output indicative of the L1 tag array set and the L1 tag array way entry that matched.

In Example 2, the subject matter of Example 1 can optionally include: when the TLB tag portion does not match any of the TLB tags stored in the way entries: (i) identifying one of the way entries; (ii) storing the TLB tag portion of the virtual memory address in a TLB tag array entry associated with the TLB set and the way entry identified; (iii) obtaining a physical memory address associated with the virtual memory address; and (iv) storing a portion of the physical memory address in an entry of a TLB data array, wherein the TLB data array entry is associated with the TLB set and the way entry identified.

In Example 3, the subject matter of Example 2 can optionally include: identifying all L1 tag array entries with stored TLB vectors equal to the TLB vector; and invalidating all of the L1 tag array entries identified.

In Example 4, the identifying of all of the L1 tag array entries included in the subject matter of Example 3 can optionally include accessing a content addressable storage array indicative of the stored TLB vectors in the L1 tag array.

In Example 5, entries in the content addressable storage array included in the subject matter of Example 4 can optionally include an encoded representation of the TLB set and an encoded representation of the TLB way.

In Example 6, the TLB vector included in the subject matter of Example 1 can optionally include a TLB set component indicative of the TLB set and a TLB way component indicative of the TLB tag array way entry.

In Example 7, the TLB set component included in the subject matter of Example 6 can optionally include an encoded representation of the TLB set.

In Example 8, the TLB set component included in the subject matter of Example 6 can optionally include a decoded representation of the TLB set.

In Example 9, the subject matter of Example 1 can optionally include storing, in an entry of the L1 tag array, a portion of the physical memory address in lieu of a TLB vector when a physical memory access is recognized.

In Example 10, the TLB set associated with the virtual memory address included in the subject matter of Example 1 is optionally indicated by a TLB set portion of the virtual memory address; and the L1 tag array set associated with the virtual memory address included in the subject matter of Example 1 is optionally indicated by an L1 tag array set portion of the virtual memory address, wherein the TLB set portion and the L1 tag array set portion are independent of one another.

Example 11 is a computer system comprising: a processor including a processing core to execute a memory access instruction indicating a virtual memory address; a cache memory; a memory controller, accessible to the processor, including a page table to translate virtual memory addresses to corresponding physical memory addresses; memory, accessible to the processor, via the memory controller; and an I/O hub, accessible to the processor, to provide I/O interfaces to communicate with I/O devices; wherein the cache memory includes: (i) a translation lookaside buffer (TLB) including a TLB tag array and a TLB content array, the TLB tag array and TLB content array each including a plurality of TLB sets, each TLB set associated with a group of way entries; (ii) a cache array including a level 1 (L1) tag array and a cache content array, the L1 tag array and cache content array each including a plurality of cache array sets, each cache array set associated with a group of way entries; and (iii) tag structure logic to: store TLB vectors in the L1 tag array, wherein the TLB vectors identify an entry of the TLB content array containing a portion of a physical memory address corresponding to the virtual memory address; generate TLB vectors responsive to receiving virtual memory addresses that hit in the TLB tag array; and compare a generated TLB vector with a TLB vector stored in the L1 tag array to determine a cache hit.

In Example 12, the TLB vector included in the subject matter of Example 11 can optionally include less bits than the portion of the physical memory address stored in the TLB content array.

In Example 13, the tag structure logic included in the subject matter of Example 12 can optionally include logic to: (i) identify a set in the TLB from a first portion of the virtual memory address; and (ii) identify a set in the cache array from a second portion of the virtual memory address.

In Example 14, the number of way entries associated with each TLB set and the number of way entries associated with each cache array set included in the subject matter of Example 11 can optionally be the same.

Example 15 is a processor comprising: a processing core to execute a memory access instruction associated with a virtual memory address; a core cache memory, accessible to the processor, including: a set associative, multiple way translation lookaside buffer (TLB) including a TLB tag array and a TLB content array; and a set associative, multiple way cache array including a level 1 (L1) tag array and a cache content array; and tag structure logic to: (i) determine a TLB set associated with the virtual memory address; (ii) compare a TLB tag portion of the virtual memory address with TLB tags stored in way entries of the TLB tag array, wherein the way entries are associated with the TLB set; (iii) generate, when the TLB tag portion matches a TLB tag stored in one of the way entries, a TLB vector indicative of the TLB set and the way entry that matched; (iv) identify a set in a L1 tag array based on the virtual memory address; (v) compare the TLB vector with stored TLB vectors stored in way entries of an L1 tag array, wherein the L1 tag array way entries are associated with the L1 tag array set; and (vi) generate, when the TLB vector matches a stored TLB vector in one of the L1 tag array way entries, a way select output indicative of the L1 tag array set and the L1 tag array way entry that matched.

In Example 16, the tag structure logic included in the subject matter of Example 15 is optionally operable to allocate a TLB entry when the TLB tag portion does not match any of the TLB tags stored in the way entry, wherein the tag structure logic is operable to: (i) identify one of the way entries; (ii) store the TLB tag portion of the virtual memory address in a TLB tag array entry associated with the TLB set and the way entry identified; (iii) obtain a physical memory address associated with the virtual memory address; and (iv) store a portion of the physical memory address in an entry of a TLB data array, wherein the TLB data array entry is associated with the TLB set and the way entry identified.

In Example 17, the tag structure logic included in the subject matter of Example 16 is optionally operable to: (i) identify all L1 tag array entries with stored TLB vectors equal to the TLB vector; and (ii) invalidate all of the L1 tag array entries identified.

In Example 18, the tag structure logic included in the subject matter of Example 17 is optionally operable to identify all of the cache tag entries includes tag structure logic to access a content addressable storage array indicative of the stored TLB vectors in the L1 tag array.

In Example 19, the entries in the content addressable storage array included in the subject matter of Example 18 can optionally include an encoded representation of the TLB set and an encoded representation of the TLB way.

In Example 20, the TLB set associated with the virtual memory address included in the subject matter of Example 15 is optionally indicated by a TLB set portion of the virtual memory address; and the L1 tag array set associated with the virtual memory address included in the subject matter of Example 15 is optionally indicated by an L1 tag array set portion of the virtual memory address, wherein the TLB set portion and the L1 tag array set portion are independent of one another.

In Example 21, the TLB vector included in the subject matter of any of Examples 1-5 can optionally include a TLB set component indicative of the TLB set and a TLB way component indicative of the TLB tag array way entry.

In Example 22, the number of way entries associated with each TLB set and the number of way entries associated with each cache array set included in the subject matter of any of Examples 11-13 can optionally be the same.

In Example 23, the tag structure logic included in the subject matter of any of Examples 15 or 16 is optionally operable to: (i) identify all L1 tag array entries with stored TLB vectors equal to the TLB vector; and (ii) invalidate all of the L1 tag array entries identified.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for implementing a tag structure, the method comprising:
   determining a translation lookaside buffer (TLB) set associated with a virtual memory address indicated in a memory access instruction;
   comparing a TLB tag portion of the virtual memory address with TLB tags stored in way entries of a TLB tag array, wherein the way entries are associated with the TLB set;
   generating, when the TLB tag portion matches a TLB tag stored in one of the way entries, a TLB vector indicative of the TLB set and the way entry that matched;
   identifying a set in a level 1 (L1) tag array based on the virtual memory address;
   comparing the TLB vector with stored TLB vectors stored in way entries of the L1 tag array, wherein the L1 tag array way entries are associated with the L1 tag array set; and
   when the TLB vector matches a stored TLB vector in one of the L1 tag array way entries, generating a way select output indicative of the L1 tag array set and the L1 tag array way entry that matched.

2. The method of claim 1, further comprising:
   when the TLB tag portion does not match any of the TLB tags stored in the way entries:
      identifying one of the way entries;
      storing the TLB tag portion of the virtual memory address in a TLB tag array entry associated with the TLB set and the way entry identified;
      obtaining a physical memory address associated with the virtual memory address; and
      storing a portion of the physical memory address in an entry of a TLB data array, wherein the TLB data array entry is associated with the TLB set and the way entry identified.

3. The method of claim 2, further comprising:
   identifying all L1 tag array entries with stored TLB vectors equal to the TLB vector; and
   invalidating all of the L1 tag array entries identified.

4. The method of claim 3, wherein identifying all of the L1 tag array entries includes accessing a content addressable storage array indicative of the stored TLB vectors in the L1 tag array.

5. The method of claim 4, wherein entries in the content addressable storage array include an encoded representation of the TLB set and an encoded representation of the TLB way.

6. The method of claim 1, wherein the TLB vector includes a TLB set component indicative of the TLB set and a TLB way component indicative of the TLB tag array way entry.

7. The method of claim 6, wherein the TLB set component includes an encoded representation of the TLB set.

8. The method of claim 6, wherein the TLB set component includes a decoded representation of the TLB set.

9. The method of claim 1, further comprising:
   storing, in an entry of the L1 tag array, a portion of the physical memory address in lieu of a TLB vector when a physical memory access is recognized.

10. The method of claim 1, wherein:
    the TLB set associated with the virtual memory address is indicated by a TLB set portion of the virtual memory address; and
    the L1 tag array set associated with the virtual memory address is indicated by an L1 tag array set portion of the virtual memory address, wherein the TLB set portion and the L1 tag array set portion are independent of one another.

11. A computer system, comprising:
    a processor including a processing core to execute a memory access instruction indicating a virtual memory address;
    a cache memory;
    a memory controller, accessible to the processor, including a page table to translate virtual memory addresses to corresponding physical memory addresses;
    memory, accessible to the processor, via the memory controller; and
    an I/O hub, accessible to the processor, to provide I/P interfaces to communicate with I/O devices;
    wherein the cache memory includes:
       a translation lookaside buffer (TLB) including a TLB tag array and a TLB content array, the TLB tag array and TLB content array each including a plurality of TLB sets, each TLB set associated with a group of way entries;
       a cache array including a level 1 (L1) tag array and a cache content array, the L1 tag array and cache content array each including a plurality of cache array sets, each cache array set associated with a group of way entries; and
       tag structure logic to:
          store TLB vectors in the L1 tag array, wherein the TLB vectors identify an entry of the TLB content array containing a portion of a physical memory address corresponding to the virtual memory address;
          generate TLB vectors responsive to receiving virtual memory addresses that hit in the TLB tag array; and
          compare a generated TLB vector with a TLB vector stored in the L1 tag array to determine a cache hit.

12. The computer system of claim 11, wherein a TLB vector includes less bits than the portion of the physical memory address stored in the TLB content array.

13. The computer system of claim 12, wherein the tag structure logic includes logic to:
    identify a set in the TLB from a first portion of the virtual memory address; and
    identify a set in the cache array from a second portion of the virtual memory address.

14. The computer system of claim 11, wherein the number of way entries associated with each TLB set and the number of way entries associated with each cache array set is the same.

15. A processor, comprising:
    a processing core to execute a memory access instruction associated with a virtual memory address;
    a core cache memory, accessible to the processor, including:
       a set associative, multiple way translation lookaside buffer (TLB) including a TLB tag array and a TLB content array; and
       a set associative, multiple way cache array including a level 1 (L1) tag array and a cache content array; and
    tag structure logic to:
       determine a TLB set associated with the virtual memory address;
       compare a TLB tag portion of the virtual memory address with TLB tags stored in way entries of the TLB tag array, wherein the way entries are associated with the TLB set;
       generate, when the TLB tag portion matches a TLB tag stored in one of the way entries, a TLB vector indicative of the TLB set and the way entry that matched;

identify a set in a L1 tag array based on the virtual memory address;

compare the TLB vector with stored TLB vectors stored in way entries of the L1 tag array, wherein the L1 tag array way entries are associated with the L1 tag array set; and generate, when the TLB vector matches a stored TLB vector in one of the L1 tag array way entries, a way select output indicative of the L1 tag array set and the L1 tag array way entry that matched.

16. The processor of 15, wherein the tag structure logic is operable to allocate a TLB entry when the TLB tag portion does not match any of the TLB tags stored in the way entry, wherein the tag structure logic is operable to:

identify one of the way entries;

store the TLB tag portion of the virtual memory address in a TLB tag array entry associated with the TLB set and the way entry identified;

obtain a physical memory address associated with the virtual memory address; and store a portion of the physical memory address in an entry of a TLB data array, wherein the TLB data array entry is associated with the TLB set and the way entry identified.

17. The processor of claim 16, wherein the tag structure logic is operable to:

identify all L1 tag array entries with stored TLB vectors equal to the TLB vector; and invalidate all of the L1 tag array entries identified.

18. The processor of claim 17, wherein the tag structure logic operable to identify all of the cache tag entries includes tag structure logic to access a content addressable storage array indicative of the stored TLB vectors in the L1 tag array.

19. The processor of claim 18, wherein entries in the content addressable storage array include an encoded representation of the TLB set and an encoded representation of the TLB way.

20. The processor of claim 15, wherein:

the TLB set associated with the virtual memory address is indicated by a TLB set portion of the virtual memory address; and the L1 tag array set associated with the virtual memory address is indicated by an L1 tag array set portion of the virtual memory address, wherein the TLB set portion and the L1 tag array set portion are independent of one another.

* * * * *